United States Patent [19]

Ritter et al.

[11] Patent Number: 5,561,842

[45] Date of Patent: Oct. 1, 1996

[54] MOBILE RADIO NETWORK

[75] Inventors: Gerhard Ritter, Thaining; Franz Schreib; Egon Schulz, both of Munich, all of Germany

[73] Assignee: Siemens Aktiengesellschaft, Munich, Germany

[21] Appl. No.: 392,729

[22] Filed: May 30, 1995

[30] Foreign Application Priority Data

Aug. 26, 1992 [DE] Germany ................ 42 28 275.6

[51] Int. Cl.$^6$ .................. H04B 7/26; H04Q 7/36
[52] U.S. Cl. ............... 455/33.1; 455/34.1; 455/56.1; 379/59
[58] Field of Search .................. 455/33.1, 33.2, 455/33.4, 34.1, 56.1; 379/59, 60; 375/202, 205

[56] References Cited

U.S. PATENT DOCUMENTS 5,459,759  10/1995  Schilling ............ 455/33.1 X

FOREIGN PATENT DOCUMENTS

| 0150399 | 7/1985 | European Pat. Off. . |
|---|---|---|
| 0531090 | 10/1991 | European Pat. Off. . |
| 2806178 | 8/1978 | Germany . |
| 4238295 | 5/1994 | Germany . |
| 3-244224 | 10/1991 | Japan . |
| 2261575 | 5/1993 | United Kingdom . |

OTHER PUBLICATIONS

"Overview of Cellular CDMA", William C. Y. Lee, IEEE Transactions on Vehicular Technology, vol. 40, No. 2, May 1991, pp. 291–302.

*Primary Examiner*—Chi H. Pham
*Attorney, Agent, or Firm*—Hill, Steadman & Simpson

[57] ABSTRACT

A ring-shaped network structure having a plurality of rings of range sections and a sector subdivision is provided, the number of which corresponds to the number of cells positioned along a ring. Positioned in the center is a base station with antennae arranged at a raised location for illuminating all cells or for the reception from the individual cells respectively. The antennae are designed as strongly focusing directional antennae which supply at least two cells lying in radial direction from the antenna location within the same sector with the same frequency in each case.

4 Claims, 4 Drawing Sheets

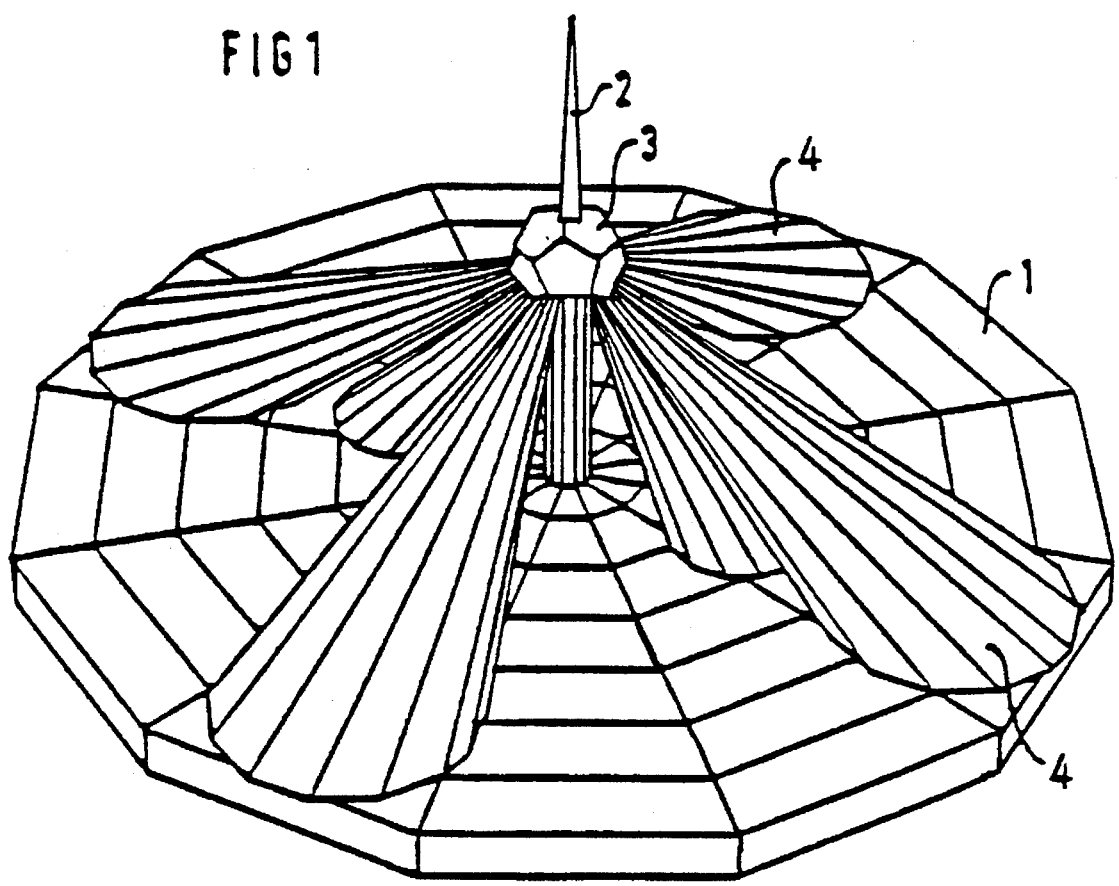

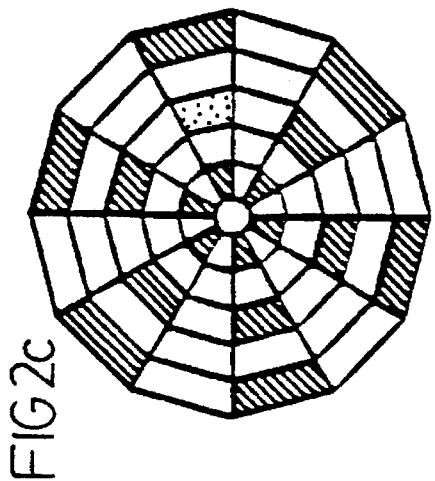
FIG 2c  Region 3
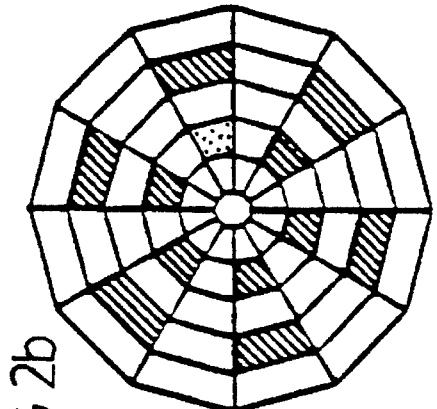
FIG 2b  Region 2
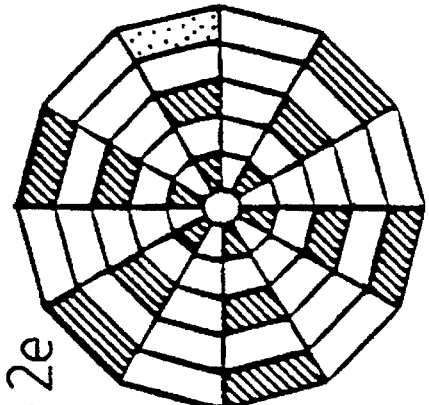
FIG 2e  Region 5
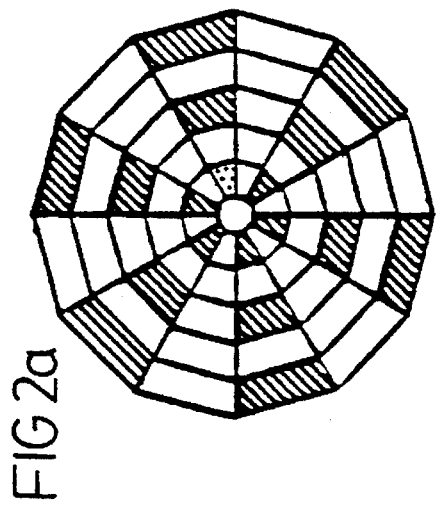
FIG 2a  Region 1
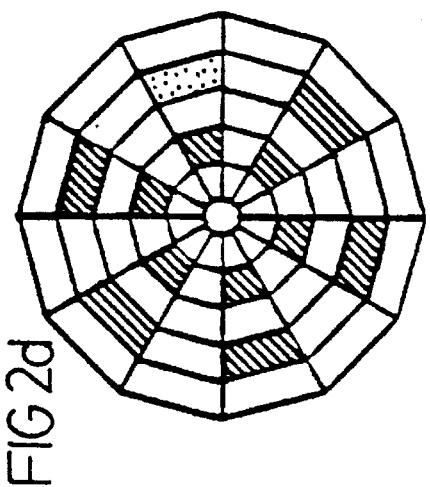
FIG 2d  Region 4

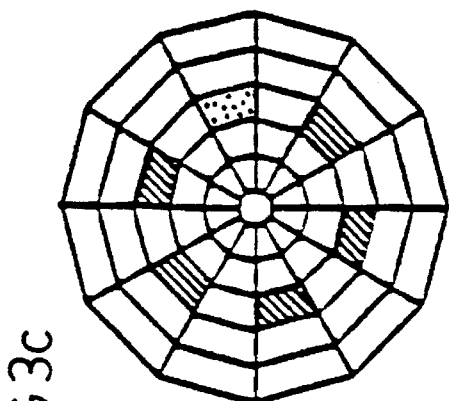
FIG 3c  Region 3
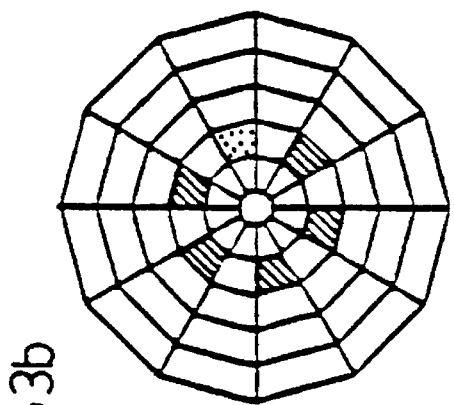
FIG 3b  Region 2
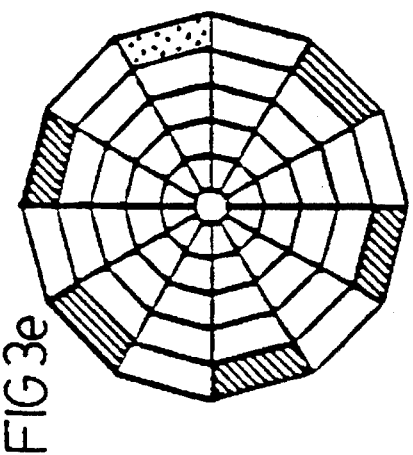
FIG 3e  Region 5
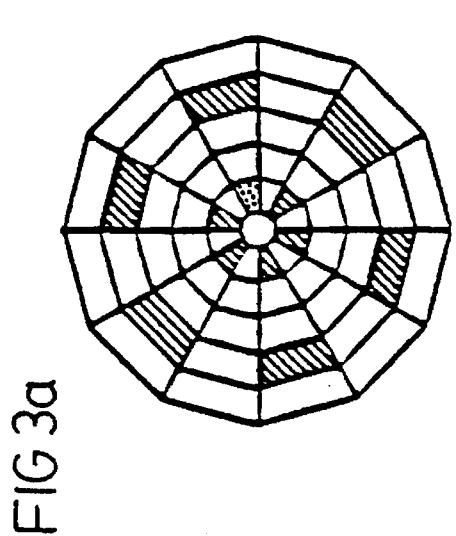
FIG 3a  Region 1
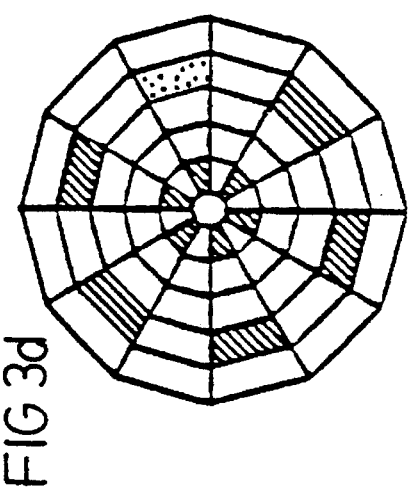
FIG 3d  Region 4

$f_i$: Frequency band    $s_i$: Spread code i

1

MOBILE RADIO NETWORK

BACKGROUND OF THE INVENTION

The invention relates to a mobile radio network having a number of base stations in mutual spatial arrangement in the manner of a cellular system, in which in each case one base station with an antenna is arranged within a cell and radiates electromagnetic waves to the mobile stations located within the cell, or receives them from the mobile stations within the cell respectively.

Such a radio network is essentially known from the article "Overview of Cellular CDMA" by William C. Y. Lee published in IEEE Transactions on Vehicular Technology, Vol. 40, No. 2, May 1991, pages 291 to 302.

In a mobile radio network with the CDMA multiple access method, the users (mobile stations) are differentiated by means of different spread codes. Spread codes may be represented by PN codes or PN sequences (PN=pseudo noise).

When supplying regions with mobile radio services, there is a tendency to have small radio cells due to high frequencies and the density of subscribers in built-up areas. However, the number of base stations required consequently also rises, which in turn leads to high infrastructure costs.

SUMMARY OF THE INVENTION

The object of the invention is to state a solution to reduce the investment in infrastructure.

In a mobile radio network of the type described in the introduction, this object is achieved by a ring-shaped structure having cell rings positioned around the center and by a subdivision into sectors in accordance with the number of cells within the rings with different configurations, comprising one or more frequency bands, a set of spread codes, time slots or polarization levels, or any combination of the above, in adjacent sectors, and by a central base station in the center to illuminate all cells, or for the reception from the individual cells respectively, with antennae installed at a raised location which are designed as strongly focusing directional antennae, and at least two cells lying in radial direction from the antenna location within the same sector are operated within the same configuration in each case.

This central arrangement of the base stations for the individual radio cells at one location and illumination of the cells by means of directional antennae positioned on a high structure/mast results in a reduction of the infrastructure costs, a reduction of multipath propagation, increased flexibility for the dynamic channel allocation and also the possibility of dynamic cell splitting. In this case a configuration is allocated to a directional antenna and not only to a set of frequencies. A configuration is a set of frequency bands, code sequences, time slots and polarization levels of the waves transmitted which can be used singly or in any combination with each other. If only the options of frequency bands and time slots are used when setting up a configuration, then a pure F/TDMA system is obtained. If, on the other hand, only the options of frequency bands and code sequences are used, then a pure CDMA (code division multiple access) system is obtained. The principle of CDMA is to differentiate mobile radio subscribers not by different frequencies, but rather by sequences of codes. The signals for all subscribers are transmitted in the same frequency band; the receive signal is then detected by the subscriber having its code sequence. In this way it receives the transmission signal intended for it. Two spread techniques for CDMA are distinguished, namely spreading by means of spread codes (direct sequence code), and spreading by means of frequency hopping. With the former type, the user data of the subscribers are folded using a spread code and are transmitted via a common frequency band or via a plurality of frequency bands. If a plurality of frequency bands are used, then the subscribers are divided between the individual frequency bands. With frequency hopping, a different narrowband range of the frequency band predetermined by a code sequence or a plurality of frequency bands is continuously allocated to the subscriber.

Advantageous refinements and further developments of the subject-matter of the invention are as follows.

The respective configuration has one or mode frequency banks and a set of spread codes in the case of the CDMA (code division multiple access) multiple access method. The number of cells within a sector lying between cells having the same configuration is variable. A flexible cell structure is produced by combining adjacent cells of the same or adjacent sectors to form a new cell.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a diagrammatic representation of a network structure with a central base station, FIG. 2 shows a scenario with five range sections with cluster size 4, FIG. 3 shows a scenario with five range sections with cluster size 8.

DESCRIPTION OF THE PREFERRED EMBODIMENTS

Figure 4B:
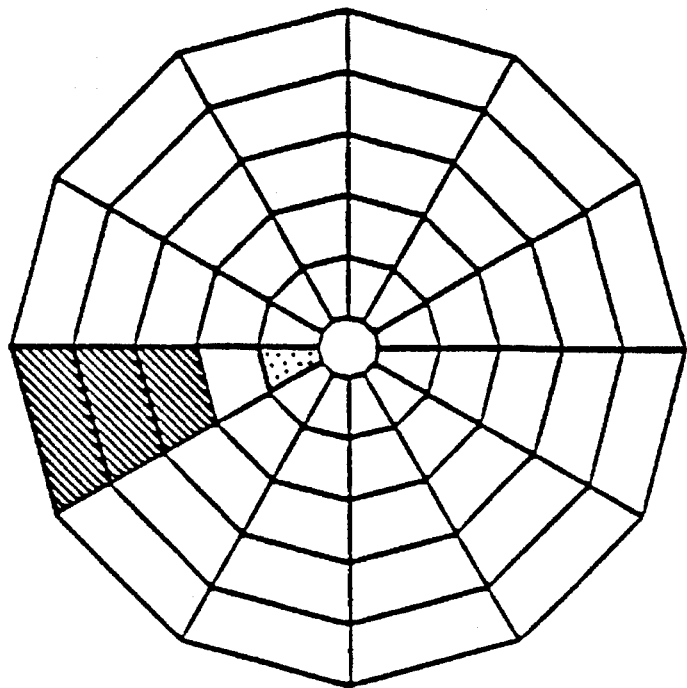
FIG. 4 shows a scenario with five range sections with variable cell structure.

FIG. 1 illustrates a network structure with seven range sections which are positioned in the manner of a ring around a base station arranged in the center. The antennae 3 are arranged on a tower 2; it may be expedient to arrange the other base station equipment in the vicinity of the antennae as well if possible in order to obtain short antennae leads. Some of the beams 4 radiating from the antennae 3 which illuminate particular cells are indicated. The cell boundaries must be defined here by means of the radiation pattern in order to provide a plurality of cells within a sector with the same configuration.

FIG. 2 shows a scenario with five range sections with cluster size 4. Five partial diagrams, designated regions 1 to 5, are shown in accordance with the five range sections. The individual range sections are positioned in the manner of a ring around a base station arranged in the center. Each range section comprises adjacent cells, the number of which corresponds to that of the sectors into which the overall structure is subdivided. In the present example there are 12 sectors of 30° in each case. This number can however be varied as desired, so that wider or narrower sectors are produced, and also the sector size can vary from range section to range section.

A black cell is shown in each partial diagram in FIG. 2 in each case which represents the cell whose signal is considered to be the user signal and which is located in one of the range sections from region 1 to region 5 in each case. Also shown are hatched cells which lie in other range sections and sectors using the same configuration as the black cell under consideration, that is to say which represent spurious signals for the latter. The light cells in the individual diagrams are termed neutral cells and represent adjacent cells in the same sector or cells of adjacent sectors using a different configuration than the black cell under consideration.

In the example under consideration, cluster size 4 means that two different configurations are used in one sector, and in turn two other configurations differing from the aforesaid ones are used in an adjacent sector. For the partial diagram of region 1, this means that a first configuration k1 is used in range sections 1, 3 and 5, and a second configuration k2 differing from that is used in range sections 2 and 4. Thus, with respect to the configurations, on the one hand the partial diagrams of region 1, region 3 and region 5 correspond to one another, and on the other hand the partial diagrams of region 2 and region 4 also correspond to one another.

In the exemplary embodiment according to FIG. 3 with a scenario with five range sections with cluster size 8, in contrast to the previous exemplary embodiment with cluster size 4, four different configurations are used in one sector and four further configurations differing from the aforesaid ones are used in the adjacent sector. In this case it is envisaged that a first configuration is used in the first range section in the first partial diagram, which is used again in the fourth range section (see black field and hatched field in range sections 1 and 4). The partial diagram 4 (region 4) shows an analogous case in which the cell in the first range section is hatched and the corresponding cell in the fourth range section is black. The three further configurations of the total of four provided in one sector are used in range sections 2, 3 and 5 (cf. here the black cells in the partial diagrams of region 2, region 3 and region 5).

Figure 4A:
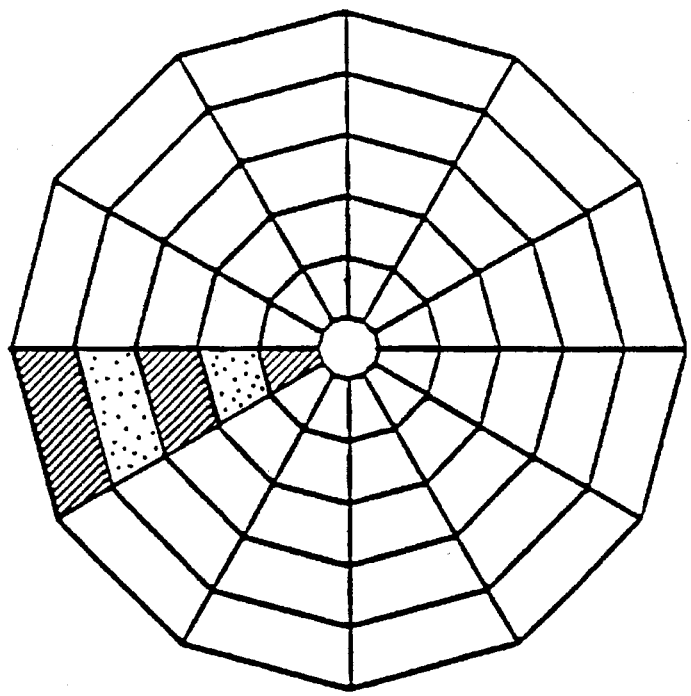

FIG. 4 shows in two partial diagrams an example of dynamic channel allocation based on the CDMA multiple access method in each case. In this case the network structure corresponds to the exemplary embodiments illustrated in FIGS. 2 and 3. In the arrangement according to FIG. 4a, it is envisaged that the configuration k1 comprising the frequency band f1 and the spread codes s1, s2, s3, s4, s5 is used in each case in the cells of range sections 1, 3 and 5, and the configuration k2 comprising the frequency band f1 and the spread codes s7, s8, s9 is used in the cells of range sections 2 and 4 (dark hatching).

The arrangement according to FIG. 4b shows an example in which the cells of a plurality of range sections (regions 3, 4 and 5) are combined to form one cell in which the configuration k3 comprising the frequency band f1 and the spread code s1 is used. The configuration k4 comprising the frequency band f1 and the spread codes s2, s3 is used in the cell of the second region 2, while the configuration k5 comprising the frequency band f1 and the spread codes s4, s5, s6, s7, s8, s9 is available to the cell of the innermost region.

It is therefore demonstrated with the aid of the arrangements according to FIGS. 4a and 4b that an optional distribution of all the configurations available overall is possible within the cells, and that also any cells using an identical configuration can be combined if there is a corresponding requirement. Adaptation to the respective traffic-related situations is therefore possible. As a result of the network structure with a central base station common to all the cells according to the invention, such flexibility with respect to the channel allocation is particularly favorable since the administration for all cells is performed at one point and thus it is a particularly simple matter to make internal connections. This is an essential advantage of the arrangement according to the invention, in addition to the simplified and cost-saving infrastructure due to the omission of many base stations and their concentration at a central point.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A mobile radio network having a number of base stations in mutual spatial arrangement in a cellular system, comprising:

a ring-shaped structure having cell rings, with a number of cells in each ring thereof, positioned around a center of the ring-shaped structure, the ring-shaped structure being subdivided into sectors in accordance with the number of cells within the cell rings with different configurations consisting of at least one of a group consisting of at least one frequency band, a set of spread codes, time slots and polarization levels;

central base station means, located at the center of the ring-shaped structure of the cellular system, for transmitting to each of the cells of the ring-shaped structure and for reception from each of the cells of the ring-shaped structure, said central base station means having a plurality of strongly focusing directional antennae located above the center of the ring-shaped structure for linking the central base station means to the cells of the ring-shaped structure;

wherein at least two cells lying in a radial direction of the ring-shaped structure and lying within a common sector of the ring-shaped structure are operated with a common configuration.

2. The mobile radio network as claimed in claim 1, wherein a respective configuration comprises at least frequency band and a set of spread codes in the case of a code division multiple access method.

3. The mobile radio network as claimed in claim 1, wherein a number of cells within a sector lying between further cells having the same configuration is variable.

4. The mobile radio network as claimed in claim 1, wherein a flexible cell structure is produced by combining adjacent cells of a same or adjacent sectors to form a new cell.

* * * * *